(12) United States Patent
Deppe et al.

(10) Patent No.: US 7,978,743 B2
(45) Date of Patent: Jul. 12, 2011

(54) DRIVER CIRCUIT FOR LOADS SUCH AS LED, OLED OR LASER DIODES

(75) Inventors: Carsten Deppe, Aachen (DE); Matthias Wendt, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/530,558

(22) PCT Filed: Mar. 12, 2008

(86) PCT No.: PCT/IB2008/050887
§ 371 (c)(1),
(2), (4) Date: Sep. 9, 2009

(87) PCT Pub. No.: WO2008/110990
PCT Pub. Date: Sep. 18, 2008

(65) Prior Publication Data
US 2010/0091807 A1     Apr. 15, 2010

(30) Foreign Application Priority Data

Mar. 15, 2007  (EP) ..................................... 07104191

(51) Int. Cl.
*H01S 3/00*  (2006.01)
(52) U.S. Cl. ............... 372/38.04; 372/39.02; 372/38.01; 372/38.07
(58) Field of Classification Search ............... 372/38.04, 372/38.02, 38.01, 38.07
See application file for complete search history.

(56) References Cited

U.S. PATENT DOCUMENTS

| 2003/0235062 | A1  | 12/2003 | Burgyan |
| 2005/0117615 | A1* | 6/2005  | Fujiie et al. ................. 372/38.04 |
| 2005/0185428 | A1  | 8/2005  | Crawford et al. |
| 2005/0218838 | A1  | 10/2005 | Lys |
| 2005/0231127 | A1  | 10/2005 | Yamamoto et al. |
| 2005/0243041 | A1  | 11/2005 | Vinn |
| 2006/0022607 | A1  | 2/2006  | Hsu |
| 2006/0108933 | A1  | 5/2006  | Chen |
| 2006/0181485 | A1  | 8/2006  | Kim et al. |
| 2006/0193357 | A1* | 8/2006  | Pruett ......................... 372/38.07 |
| 2007/0091036 | A1* | 4/2007  | Han et al. ......................... 345/82 |

FOREIGN PATENT DOCUMENTS

| EP | 1860922    | A1 | 11/2007 |
| WO | 2007023454 | A1 | 3/2007  |
| WO | 2007096868 | A1 | 8/2007  |

* cited by examiner

*Primary Examiner* — Kinam Park (57) ABSTRACT

A driver circuit for driving loads such as LED, OLED or LASER diode devices includes a switching converter that has a switching element and reactive elements to provide an output switching voltage by sequential switching operations of the switching element. The load is connected to the output switching voltage. A linear current driver circuit is connected in series to the load and includes an amplification element and a feedback circuit with a current control input. In order to enable the circuit to be easily used, a control unit is provided with a sensing input for a current or voltage at the linear current driver. A microcontroller executes a control program for processing the sensing input and providing both a current control output and a switching control output, set in accordance with a set current value.

9 Claims, 6 Drawing Sheets

DRIVER CIRCUIT FOR LOADS SUCH AS LED, OLED OR LASER DIODES

FIELD OF THE INVENTION

The present invention relates to driver circuit for a load such as LED, OLED or LASER diodes and a method for operating one or more of such loads.

BACKGROUND OF THE INVENTION

Light emitting diodes (LEDs) are used today in a plurality of lighting and display applications, where they are preferred over conventional lamps due to significant advantages such as high energy efficiency and long operating life. A special type of LEDs are organic light-emitting diodes (OLED). Another type of electrical load that is targeted by the present invention are LASER devices.

Regarding the demands posed on driver circuits for loads such as LED, OLED and LASER diodes, these electrical loads require very accurate on-current. In some applications, lighting units are driven in a pulsed manner. It is thus important for the driver circuit to be able to provide current pulses with accurate on-current, minimal pulse distortion, low raise and fall times and low overswing.

In many lighting and display applications, the loads are operated with pulse patterns. For example, this may be used to control the brightness by techniques such as PWM (pulse width modulation) or PDM (pulse density modulation). If the switching frequency is high enough, the human eye will integrate the brightness and perceive a mean brightness.

Also, pulses may be used in display applications with sequential colour rendering. In order to use monochromatic light modulation devices, such as, e.g. DMD (digital micromirror device) or DLP (digital light processing) for displaying colour images, the devices are sequentially used for different colour lights. The light, in this case, may be provided by LED, OLED or LASER diodes sequentially driven with short pulses.

Known electrical circuits for driving such loads include on one hand linear mode driving circuits. Such linear mode driving circuits are known to the skilled person and may be implemented in many different ways. A linear current driver comprises an amplification element (such as, for example, an operational amplifier, a transistor, MOSFET or other comparable component) and a current sensing means for sensing a current through the driver and controlling the amplification element to achieve an analogue control with feedback.

Linear current drivers can be designed to have the advantage of an excellent dynamic behavior, but are known to introduce high losses.

Another known type of driving circuit is a switching converter. Such a converter comprises at least one switching element and a reactive element (such as an inductance or capacitance, or both). An output voltage is generated by sequential switching operations of the switching element. By modification of the duty cycle, the output may be controlled. Switching converters are known for high efficiency, but have limited dynamic behavior.

In US 2006/0108933, LEDs are driven by a combination of a switching converter and linear current drivers. The DC to DC converter outputs a direct current voltage for feeding two LED series connected in parallel. Each series comprises a constant current circuit connected in series. Each constant current circuit receives a control signal and controls the LED current accordingly. An analogue feedback circuit compares feedback voltages for each LED series and uses the lower of the two as a feedback voltage to the DC to DC converter. The converter compares the feedback voltage to an internal reference voltage and adjusts its output voltage accordingly.

It is an object of the invention to provide a driver circuit and operating method well suited for the mentioned loads, which provides both reduced losses and exact control, especially for pulsed applications, and may easily be used.

SUMMARY OF THE INVENTION

The inventive driver circuit on one hand comprises a switching converter which generates a switching output voltage by sequential switching operations of a switching element. A terminal is provided for connecting a load, such as one or more LED, OLED or LASER diode devices to the output voltage. On the other hand, the driver circuit comprises a linear current driver connected in series to (a load connected at) the terminal. Thus, the load is supplied in series by the switching converter and the linear current driver.

These elements both accept a control input. The switching converter has a switching control input. By different signals provided at the switching control input, the provided output voltage is modified. The switching control input may either be direct switching information, i.e. the specific on/off-states of the switching element(s), or may be an analogue signal such as a reference voltage or a control offset. The linear current driver accepts a current control input, which may preferably be provided as an analogue current or voltage signal determining the drive current controlled by the driver.

According to the invention, a control unit is provided comprising at least one sensing input and at least two control outputs, namely a switching control output for controlling the switching converter and a current control output for controlling the linear current driver. The control unit comprises a programmable control means executing a control program. The program and the invention method work to drive the components of the circuit to provide a current through the load connected at the terminal which corresponds to a set current value. To achieve this, the sensing input is processed and a desired switching output voltage and a desired drive current are determined.

The programmable control means may be any type of device suited to execute the corresponding control program. Specific examples include microprocessors, signal processors, or most preferably, microcontrollers comprising a central processing unit and a additional peripheral components, such as inputs, outputs, memory etc.

The sensing input processed by the program comprises at least a sensing input for an electrical value (current and/or voltage) at the linear current driver. This sensing input may comprise sensing the current through the driver (e.g. as a related voltage signal), but preferably also contains voltage information about the amplification element within the linear current driver.

A circuit according to the invention provides great flexibility in obtaining a load current in accordance with the set current value. From the outside, the driver circuit only needs the provided set current value. The microcontroller takes care of providing, for each state of operation, the corresponding control for the two elements, namely the switching converter and the linear current driver. The combination of these two allows to benefit both from the excellent dynamic properties of the linear current driver, and from the reduce losses at the switching converter. Still, external control of the circuit is very easy.

As will become apparent, the inventive device and method are well-suited for driving the load with current pulses.

In a preferred embodiment, the set current value is not constant but changes over time. Specifically for pulses, there will be change portions, where the value changes over time (in fact for pulse applications, the change portions will be extremely short, namely correspond to the rising and falling edges of the pulse signal). Also, there will be steady portions, where the set current value will remain constant, or at least substantially constant (which is understood to mean a variation of no more than +/−20%, preferably +/−5%). It should be noted that in many applications, there is information available in advance about timing and/or height of the pulses, e.g. in the case of a periodic pulse signal. Information about periodicity of the set current value may be provided from the outside in different forms, or may be acquired by the program in a self-learning manner.

One of the preferred embodiments relates to control within the steady portions. Here, during at least a part of the steady portions (preferably a central part, i.e. not directly bordering on a change portion), control is effected to minimize a voltage over the linear current driver. This is due to the fact that the linear current driver, if it effectively limits the load current by increasing the voltage drop at the amplification element, introduces high losses. While such losses may be tolerated for a short time, e.g. within the change portions and in limited time periods before and/or after, they should be minimized over a long term. Thus, minimizing the voltage drop over the linear current driver will significantly limit these losses. Preferably, however, minimization is performed such that a lower limit value (minimum threshold value) for the voltage is maintained, allowing the linear current driver to still operate within its linear range. This control behavior is achieved by the corresponding control program. Preferably, as will be further explained with relation to preferred embodiments, the minimum threshold value may be calculated such that a minimum voltage remains for operation of the amplification element within the linear current driver. The minimum threshold value may thus be calculated dependent on the load current. Alternatively, it is possible to determine a fixed value for the minimum threshold value, and to store this value in (or make it accessible to) the control means.

According to a further preferred embodiment, where the set current value has change portions and steady portions as above, control is effected to provide a higher desired switching output voltage at least immediately before a change portion. Thus, for example, before and optionally also (preferably shortly) after the change portion, the desired switching output voltage will be lower than within the time period comprising the change portion and the time immediately before. This raising of the switching output voltage takes account of the fact that the switching output voltage cannot be raised instantaneously. Since the reactive elements e.g. an output capacitor of the switching converter need to be charged, some time is required for the switching converter to raise the voltage. Thus, in order to provide the desired voltage value already in a change portion, the change is initiated by the control program in advance. Of course, in this case there needs to be information available to the microcontroller about impending change portions. However, this will often be the case, e.g. if the set current value is changed according to a known pulse pattern. For example, the pulse pattern may be supplied externally to the control means as a digital signal. Also, for many applications, the pulse pattern may be at least roughly periodical (so that pulse timing and at least approximate pulse height are known in advance). The periodicity may either be indicated by a signal at an external interface, or may be recognized by a special procedure within a control means. Most preferably, the pattern is supplied along with a trigger signal indicating each start of a periodically repeated pulse pattern.

It should be noted, that the raising of the switching output voltage effected in advance of an impending change portion alone has no significant influence on the load. This is, because the load is still individually controlled by the linear current driver. The excess part of electrical power supplied in this case is absorbed as losses in the linear current driver. However, the dynamic properties of the linear current driver may be fully exploited in this way.

While this is also true for changes where the set current value decreases in the change portion, it is especially applied for change portion during which the set current value rises. If, for example in a pulse application, the set current value rises and then remains constant in a following steady portion, the control program may provide a higher desired switching output voltage before and during the change portion so that e.g. an output capacitor is charged and the linear current driver may operate in the linear range also for the higher set current value. Then, within the steady portion, (at least during a later part of the steady portion) the desired output switching value is again lowered, as described above, to limit losses in the linear current driver.

According to a further preferred embodiment of the invention, the control unit comprises storage means for storing a plurality of desired switching output voltage values and desired drive current values. These storage means may be provided internally or externally to the programmable control means, e.g. microcontroller, and may comprise any type of digital storage means. Especially preferred for fast access is a RAM storage, preferably within the microcontroller. This storage is used by the program to determine, for a given set current value, an appropriate desired switching output value.

The storage means may be pre-programmed with predetermined values. According to a further preferred embodiment, however, it is preferred to have the program store values determined during control. It is further preferred to use the stored values during control as starting values only, and determine appropriate values by subsequent closed-loop control. The thus given values then may be stored in the storage means to update previous values. In this way, the storage is always kept updated, such that any changes in the driving circuit and/or the load may be compensated.

According to a further preferred embodiment, a plurality of branches are provided. The branches are connected in parallel to the output, such that they may all be driven by only one switching converter and have a common switching output voltage. Each branch has at least one terminal for connecting a load, such as an LED, OLED or LASER diode device.

While for the plurality of branches there is only one switching converter, each branch has an individual linear current driver circuit connected in series to the terminal. Also, there is an individual sensing input in each of the branches. Accordingly, the control unit will have (direct or multiplexed) input terminals for the sensing input from each of the branches. In this way, multiple loads can be very effectively driven by a circuit with low part count, where only one switching converter and only one control unit with microcontroller is used for a plurality of loads. There may be any number, such as 2, 3 or more loads connected. The loads may be driven simultaneously, but for some applications—such as sequential color rendering in projection applications—it is preferred to drive the loads sequentially.

Preferably, in the case of a plurality of branches to be driven simultaneously, the control program determines the desired switching output voltage according to the minimum measured voltage values at the linear current drivers of the individual branches. Then, individual loads are controlled by the linear current drivers in each branch.

BRIEF DESCRIPTION OF THE DRAWINGS

The above and other objects, features and advantages of the present invention will become apparent from the following description of preferred embodiments, in which.

DESCRIPTION OF DETAILED EMBODIMENTS

Figure 1:
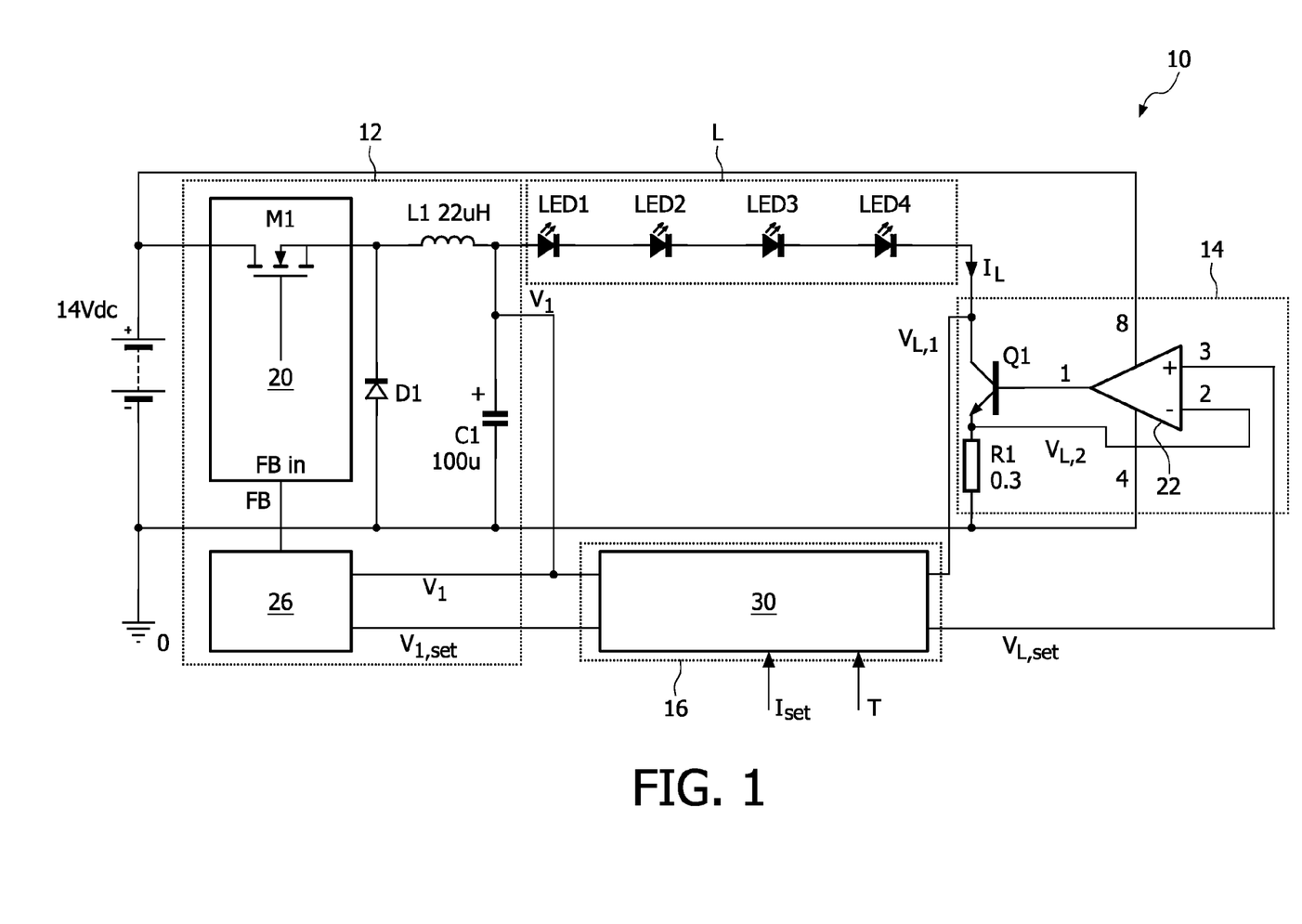
FIG. 1 shows a circuit diagram of a driver circuit according to a first embodiment of the invention.

FIG. 1 shows a circuit diagram of a driver circuit 10 connected to a load L.

In the example shown, the load L is an LED load, in this case a series of four LEDs LED1, LED2, LED3, LED4. As will become apparent, the driver circuit 10 may alternatively be used to drive other devices, especially light-emitting devices such as OLED or LASER diode devices. It is easily recognizable for the skilled person how to connect other devices to the driver circuit 10.

The driver circuit 10 comprises a switching converter 12, a linear current driver 14 and a control unit 16. The switching converter 12 supplies a switching output voltage $V_1$. The load L and the linear current driver 14 are connected in series to the output $V_1$. The control unit 16 receives a set value $I_{set}$ indicating the desired current for the operation of the load L. The control unit 16 drives the components 12, 14 of the driver circuit 10 to achieve a load current. $I_2$ which as closely as possible follows $I_{set}$.

The switching converter 12 is comprised of a switching controller 20, which may be e.g. an integrated switching controller of the type LT1765 available from Linear Technologies. The switching controller comprises a switching element $M_1$ which may be switched on and off according to a feedback signal received at an input FB in. The switching converter further comprises a diode $D_1$, a series inductance $L_1$ and an output capacitance $C_1$.

In the example shown in FIG. 1, the series inductance $L_1$ has an inductivity of 22 μH, and the output capacitance $C_1$ is an electrolytic capacitor of 100 μF. As the skilled person will certainly appreciate, the shown components constitute an exemplary embodiment only, and the switching converter 12 may be implemented using quite different components. Specifically, the shown topology of the switching converter 12, which is implemented here as a buck converter, may be replaced by other known to topologies of switching converters such as boost converters (if the output voltage is above the input voltage), flyback (in- and output have reverse polarities) or sepic.

The switching converter 12 further includes a feedback controller 26. The feedback controller 26 generally may be of any type suited to compare an actual voltage $V_1$ to a set voltage $V_L$ set and to provide a feedback signal FB accordingly. The feedback controller 26 serves to control the output voltage $V_1$ of the switching controller 12. As will become apparent later, in the preferred modes of operation according to the invention, the dynamic behavior of the output of switching converter 12 is already assumed to be quite slow. Therefore, the controller behavior of controller 26 need not be highly dynamic, and may be e. g. of an integral type (I-controller).

The linear current driver 14, as shown in FIG. 1, has a bipolar transistor $Q_1$ acting as amplification element. A feedback circuit is comprised of a series resistance $R_1$ and an operational amplifier 22. The operational amplifier 22 receives a voltage input signal $V_{L,\,set}$ at its non-inverting input and a feedback voltage $V_{L,\,2}$ at its inverting input. The feedback voltage $V_{L,\,2}$ is dependent on the load current $I_2$, which also traverses the series resistance $R_1$. The amplification element $Q_1$ is driven according to the comparison between the feedback voltage $V_{L,\,2}$ and the set voltage $V_{L,\,set}$. In this way, the input value $V_{L,\,set}$ sets a constant current value of the load current $I_L$, which is controlled by the linear current driver 14.

As linear current driver circuits per se are well known to the skilled person, it is clear that the circuit 14 may be implemented differently, as long as the basic functionality—control of the load current $I_L$ due to linear control of an amplification element, such as $Q_1$—is maintained.

Figure 5:
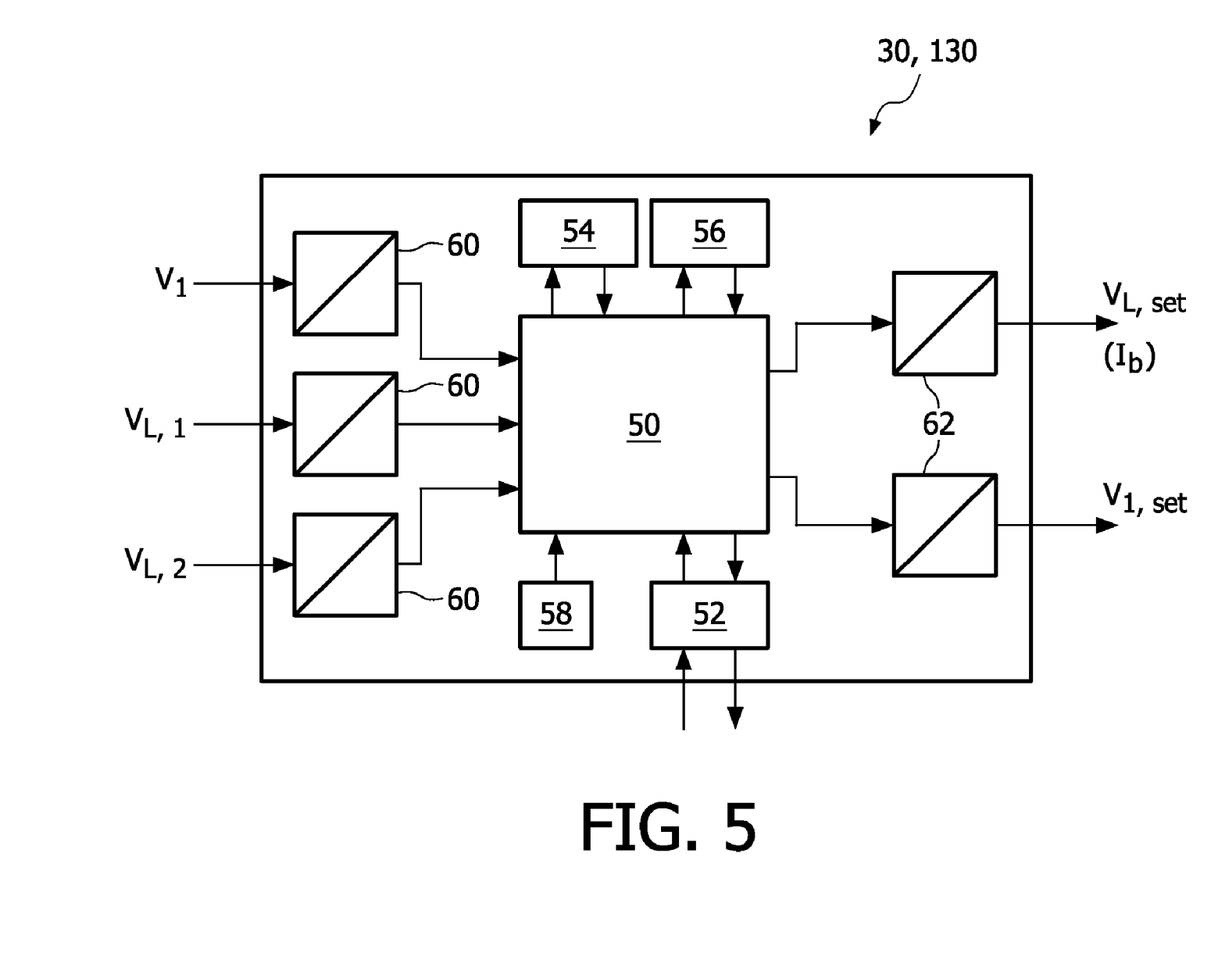
FIG. 5 shows a schematic representation of a microcontroller within the circuits of FIG. 1, FIG. 2.

The control unit 16 in the shown example is comprised of a microcontroller 30. The microcontroller 30 may be any type of programmable microcontroller, and, as shown in FIG. 5, preferably include a central processing unit 50, an input/output port 52 for receiving e.g. the set current $I_{set}$ and a trigger signal T as digital signals, a non-volatile memory 54, such as a ROM, EPROM or Flash memory for program storage, a RAM 56 for data storage and a clock 58. As will be further explained below, the microcontroller 30 has at least three A/D converter inputs 60 for receiving analogue voltage input signals and two D/A converter outputs 62 for output of analogue signals (inputs and/or outputs may be multiplexed). An example of microcontroller to be used is a NXP P 89 LPC 935.

Stored within the program memory 54 of microcontroller 30 is a program which implements control as will be explained further on: The controller 30 (and therefore, the running control program) receives a set value $I_{set}$ as input. The program also receives input about the current switching output voltage $V_1$ of the switching converter 12 and the voltage $V_{L,\,1}$ over the linear current driver 14. These inputs are received as analog signals, and are converted to digital signals using A/D converters 60 within microcontroller 30.

As outputs, microcontroller 30 outputs a voltage signal $V_{1,\,set}$ as a set voltage for the output voltage $V_1$ of the switching converter 12, and a voltage signal $V_{L,\,set}$ as a set voltage associated with a set load current $I_{L,\,set}$ through the linear current driver 14. Both output signals are analog signals, output by D/A converters 62 within microcontroller 30.

The program first operates to set said load current $I_L$ according to the received set current value $I_{set}$. This is done by applying a suited current control output $V_{L,\,set}$. The characteristic of linear current driver 14 is stored within microcontroller 30, so that microcontroller 30 may directly determine the necessary $V_{L,\,set}$ for a requested $I_{set}$. This control will now lead to the linear current driver 14 controlling the load current $I_L$ to the desired value $I_{set}$. As known for linear control, this will work very quickly and efficiently, as long as the amplification element $Q_1$ may operate within its linear range, i. e. as long as the voltage $V_{L,1}$ over the linear current driver 14 is above a lower threshold value $V_{threshold}$.

The voltage level $V_{threshold}$ required to keep the amplification element $Q_1$ within the linear range is, for the exemplary circuit shown in FIG. 1, dependent on the load current $I_L$: $V_{L,1}=I_L R_1+V_{Q1}$. For a bipolar transistor, such as $Q_1$ in the example, it is known that the minimum voltage still allowing current $I_L$ to pass is about 0.2 V. However, at such low voltages, both amplification and speed of $Q_1$ are very low as compared to higher voltages, such as $V_{Q1}$ in the range of 1-2 V.

Therefore, if dynamic behavior is not important—as is the case for a constant desired value of the load current $I_L$—the voltage $V_{threshold}$ may be chosen e.g. at $V_{threshold}=0.2V+I_L R_1$. Since the resistance R1 is chosen quite small (0.3Ω in the example shown), it is possible to calculate a constant (i.e. not dependent on the load current) value $V_{threshold}$ for the maximum load current.

The program executed further, according to a basic control function, works to control the output voltage $V_1$ such that the voltage $V_{L,1}$ at the linear current 14 is kept at the threshold value $V_{threshold}$.

This control strategy serves to benefit both from the excellent dynamic behavior of linear current driver 14 and the reduced losses of switching converter 12. By keeping the voltage $V_{L,1}$ only at the threshold voltage $V_{threshold}$ for linear operation of that device, losses here are minimized.

While this basic control strategy as explained above may advantageously be employed for unchanging (or only slowly changing) values of the set current $I_{set}$, the control program has a further control functionality for changing set current values $I_{set}$.

As described above, control unit 16 performs control of the circuit 10 as closed-loop control. For a desired (constant) $L_{set}$, the closed-loop control will eventually deliver a corresponding, necessary (constant) set value $V_{1,set}$ for the switching output voltage $V_1$. During operation, microcontroller 30 stores this information in its internal data storage 56. Data storage 56 is organized as a look-up table of demanded load current set values $L_{set}$ and determined set values $V_{1,set}$ for the switching output voltage. This table is continuously updated, as the result change (e. g. due to variations of the components of circuit 10, or of the load etc.).

If the set value $L_{set}$ changes to a new value, the program will first recall values from memory 56 to determine if a value of $V_{1,set}$ is already known for the demanded $I_{set}$. If the exact value of $I_{set}$ is not found, the value $V_{1,set}$ for the next higher $I_{set}$ may be used (alternatively, a value $V_{1,set}$ may be determined as a linear interpolation of the two nearest $I_{set}$ values). This delivers a—more or less exact—digital value $V_{1,set}$ which then is used in closed-loop control as a starting value.

As a further control functionality, the program may be used to drive the load L according to a pulse sequence with transitions known in advance. As shown in FIG. 1, microcontroller 30 receives an external trigger input T which is use to indicate the periodicity of the signal $I_{set}$. At each start of a periodic sequence (e.g. each frame in a projection application), trigger T is shortly activated. Microcontroller 30 then stores the following sequence $I_{set}$ until the next trigger T is received. For all remaining frames, the sequence $I_{set}$ is pre-stored in the memory of microcontroller 30 such that pulse timing and height are—at least approximately—known in advance.

Figure 3:
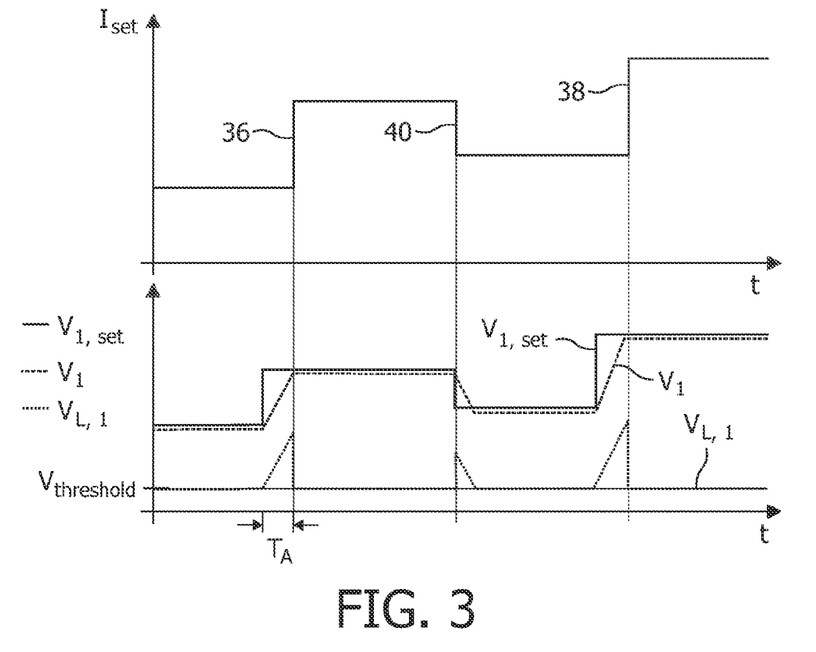
FIG. 3 shows a timing diagram showing in schematical form currents and voltages in FIG. 1 for a first operating mode.

As shown in the top part of FIG. 3, the value $I_{set}$ varies over time in pulsed manner. The signal $I_{set}$ thus comprises steady portions, where the value $I_{set}$ remains constant, and change portions (i. e. the rising and falling edges of a pulse signal), where the values change. Specifically, within FIG. 3 there are two rising edges 36, 38 and a falling edge 40 of the signal $I_{set}$.

As the switching converter 12 comprises an output capacitance $C_1$, the switching output voltage $V_1$ will only vary steadily over time, i.e. the capacitance $C_1$ needs to be charged respectively discharged for the voltage $V_1$ to change. In order to allow time for the charge process before a rising flank 36, 38 in FIG. 3, the set voltage $V_{1,set}$ is already raised by the program executed in microcontroller 30 in advance of a rising edge 36, 38.

If information is available within microcontroller 30 about an impending rising edge 36 or 38 of $I_{set}$, the set output voltage $V_{1,set}$ is raised in advanced to the level required for the next pulse. This level is retrieved from storage, as explained above. The time period $T_A$, by which $V_{1,set}$ is raised in advanced depends on the known charging behavior of the output capacitance $C_1$. This behavior may be pre-programmed within microcontroller 30 by storing the change rate of the output voltage $V_1$ which is achievable by converter 12. With the known height of the rising edges 36, 38, and consequently the known difference for the required $V_1$, the duration of $T_A$ may be calculated.

As shown in FIG. 3, rising of $V_{1,set}$ leads to a slowly rising switching output voltage $V_1$ (note, that in FIG. 3, the shown voltages are simplified, giving a linearly rising voltage $V_1$. In a real application, the voltage may rise differently, according to the specific, pre-programmed behavior of switching converter 12 with its output capacitance $C_1$).

While the output voltage $V_1$ now rises, the linear current driver 14 automatically controls the load current $I_L$ to the desired, still lower, level. Thus, the voltage $V_{L,1}$ (dotted line) rises. This, of course, leads to losses within the linear current driver 14. However, these losses are limited because of the short time period $T_A$.

As now the rising flank 36, 38 approaches, the switching output voltage $V_1$ is already at the necessary level. The linear current driver 14 now continues to perform its function to control the desired load current $I_L$ according to the newly set level. The switching output voltage $V_1$ is only subsequently slightly adjusted in closed-loop control so that linear current driver 14 operates within its linear range ($V_{L,1} \gtreqqless V_{threshold}$). Thus, the dynamic behavior of linear current driver 14 may be fully exploited for the rising flanks.

In the operating mode shown in FIG. 3, there are no special provisions for falling flanks. At the falling flank 40, the set voltage $V_{1,set}$ is reduced. During the discharge time of capacitor $C_1$, the actual voltage $V_1$ is continuously reduced. During this time, the voltage $V_{L,1}$ remains above $V_{threshold}$, so that for the limited discharge time, losses are produced in linear current driver 14. It should be noted, that to achieve the preferred highly dynamic behavior of the linear current driver at the falling flank 40 (recognizable by the steeply rising edge $V_{L,1}$ here), it is necessary to use a threshold voltage $V_{threshold}$ which is slightly above the necessary minimum (e.g. 0.2 V+$I_L R_1$). Thus, for example, the threshold value could be chosen as a fixed, slightly elevated value, e.g. $V_{threshold}=0.5V$.

Figure 4:
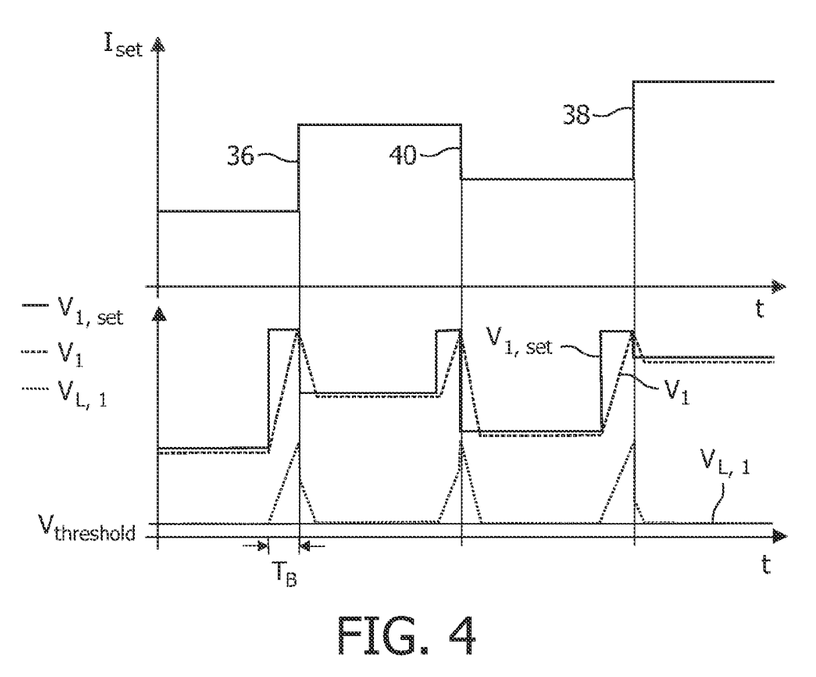
FIG. 4 shows a timing diagram showing in schematical form currents and voltages in FIG. 1 for a second operating mode.

In an alternative operating mode, as shown in FIG. 4, the same set current value Iset as in FIG. 3, with rising flank 36, 38 and a falling flank 40 is to be obtained. However, a different driving strategy is employed in order to achieve even higher overall efficiency while still obtaining a corresponding output which closely follows the set value.

As shown in FIG. 4, before each rising flank 36, 38, but also before each falling flank 40, the value of V1, set is raised to a high level. The duration of the time interval TB before each change period (rising/falling edge 36, 38, 40) is determined by the program according to the known charging/discharging behavior of the switching converter 12, such that the actual voltage V1 within the time period reaches the desired high level.

As shown in FIG. 4, the high level to which $V_{1,set}$ is raised before the change portions (rising/falling flank) is above both the $V_{1,set}$ level before and after the flank. Thus, for a falling flank 36, 38, the voltage $V_1$ (which follows the set value $V_{1,set}$ with some delay) is first raised to a high level, and then, during the following steady portion, lowered to the necessary minimum (again, the starting value for $V_{1,set}$ in the steady portion may be retrieved from storage). Also, for the falling flank 40, the voltage $V_{1,set}$ is first raised and then lowered. The benefit of this is that the voltage $V_{L,1}$ at the linear current driver 14 is raised to a higher level (as shown in FIG. 4), which allows to further improve the dynamic behavior (fast, exact control with low over-swing) of the linear current driver 14. The losses introduced by this are only effective for a short time ($T_B$).

The high levels of the voltage $V_{1,set}$ used before each change portion may be determined as follows: The value $V_{1,set}$ needs to be high enough so that after the voltage drop at the load L, the voltage $V_{L,1}$ is still high enough for the switching element $Q_1$ to have good dynamic behavior. The voltage over the load L may, for an LED load, be calculated as a constant internal voltage with an additional series resistance, $V_{LED}=V_0+I_L R_{int}$ with e.g. $V_0=1.5$ V and $R_{int}=0.5\Omega$ for a red high power LED. Since the current levels before and after the change portion are known, the desired minimal voltage $V_{L,1}$ may thus be easily calculated.

In the following, an example will be given for a rising flank 36, 38, where the set current value $I_L$ rises from 1 A to 2 A. The values of $V_{1,set}$ may then be chosen as follows:

| steady portion before | change portion | steady portion after |
|---|---|---|
| $I_L$ = 1 A | Transition | $I_L$ = 2 A |
| $V_{LEDs}$ = 8 V | maximum 10 V | $V_{LEDs}$ = 10 V |
| $V_{L1} = I_L R_1 +$ | $V_{L1} = I_{L.\,max} R_1 +$ | $V_{L1} = I_L R_1 +$ |
| 0.2 V = 0.5 V | 2 V = 2.6 V | 0.2 V = 0.8 V |
| $V_1$ = 8.5 V | $V_1$ = 12.6 V | $V_1$ = 10.8 V |

Thus, the program may determine the necessary levels for $V_{1,set}$ during each steady portion, and also during the transition portion preceding each change portion.

It should be noted that the program is not limited to the exact values according to the above calculations. On one hand, it is possible to add a certain security margin to the exact calculated value, at least in the transition portion, to ensure proper function (at the cost of slightly elevated losses) even in case that the actual estimated values of $V_{LED}$ differ in practice.

On the other hand, the stored model of the LED load, i.e. values for $V_0$ and $R_{int}$, may be updated by measuring the resulting actual value for $V_{LEDs}$ during control. The program may use the measured data to obtain updated model values (in the above example: $V_0$, $R_{int}$), and to use these updated values for future calculations.

As explained above in relation to the operating mode shown in FIG. 3, the dynamic behavior of the linear current driver 14 worsens if the amplification element $Q_1$ is driven only at the minimum level. For the operating mode shown in FIG. 3, this has been compensated by choosing $V_{threshold}$ at a (slightly elevated) constant level, e.g. $V_{threshold}=0.5$ V. In the presently explained operating mode as shown in FIG. 4, within the steady portions, the level $V_{threshold}$ may even be chosen lower. This is, because also for falling flank 40, the switching output voltage $V_1$ is chosen such that the voltage $V_{L,1}$ at the linear current driver is sufficient for good dynamic behavior. Thus, the operating mode according to FIG. 4 may be implemented to even have a higher overall efficiency.

Figure 2:
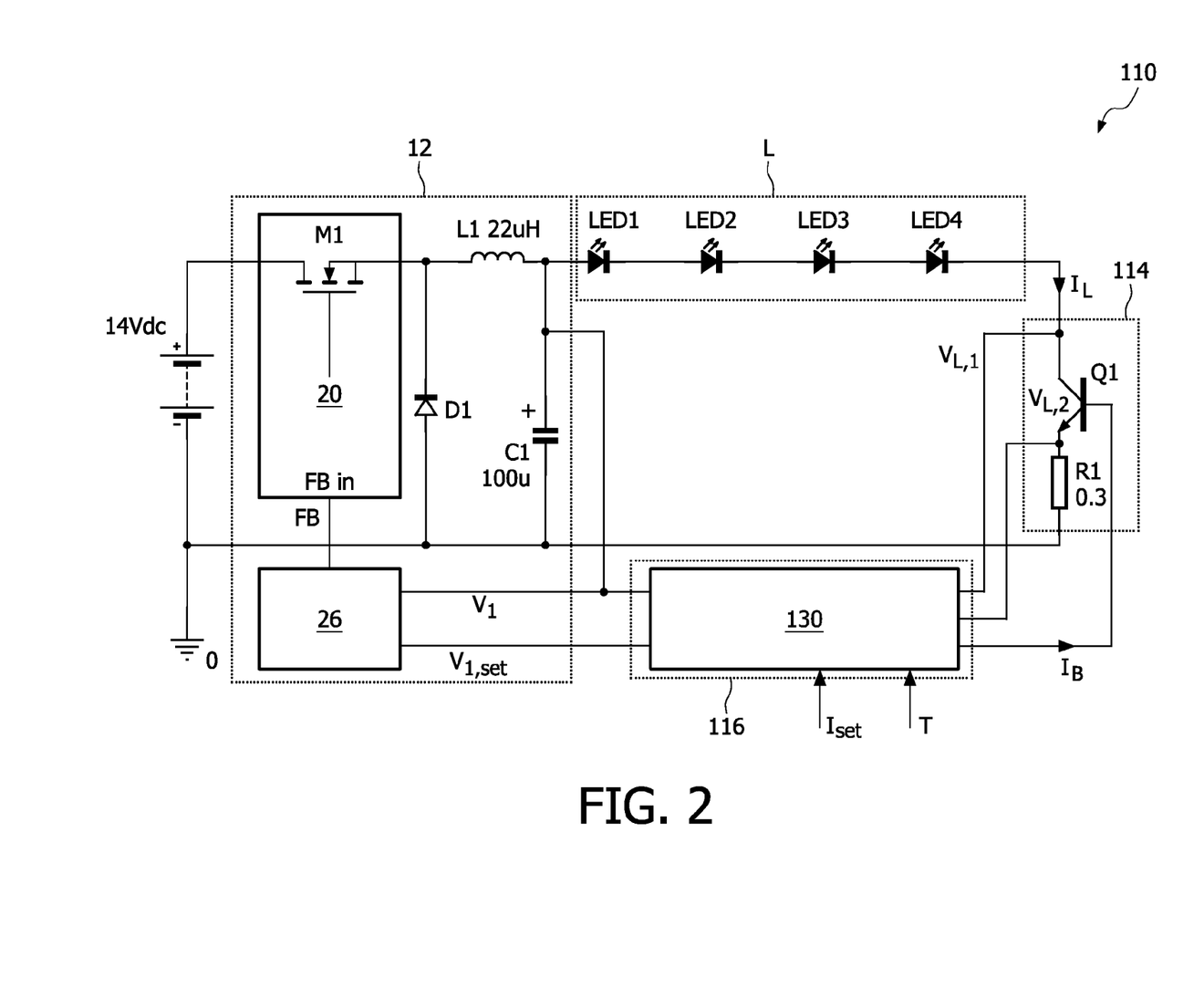
FIG. 2 shows a circuit diagram of a driver circuit according to a second embodiment of the invention.

FIG. 2 shows an alternative embodiment of the circuit 10 of FIG. 1. Like elements refer to like parts and will not be further described here.

The circuit 110 shown in FIG. 2 differs from the circuit 10 in that a linear current driver 114 is shown which only consists of a transistor $Q_1$ as the amplification element, whereas the feedback circuit is comprised of the series resistance $R_1$ and a part of microcontroller 130. Microcontroller 130 has a further input $V_{L,2}$ which serves as a feedback input directly representing the load current IL. At its output, microcontroller 130 delivers a base current $I_B$ to transistor $Q_1$ of the linear current driver 114. Thus, the program running on microcontroller 130 also performs the closed-loop control of $I_L$ in the digital domain, evaluating $V_{L,2}$ and providing an appropriate current $I_B$ to control it to the desired value $I_{set}$.

Figure 6:
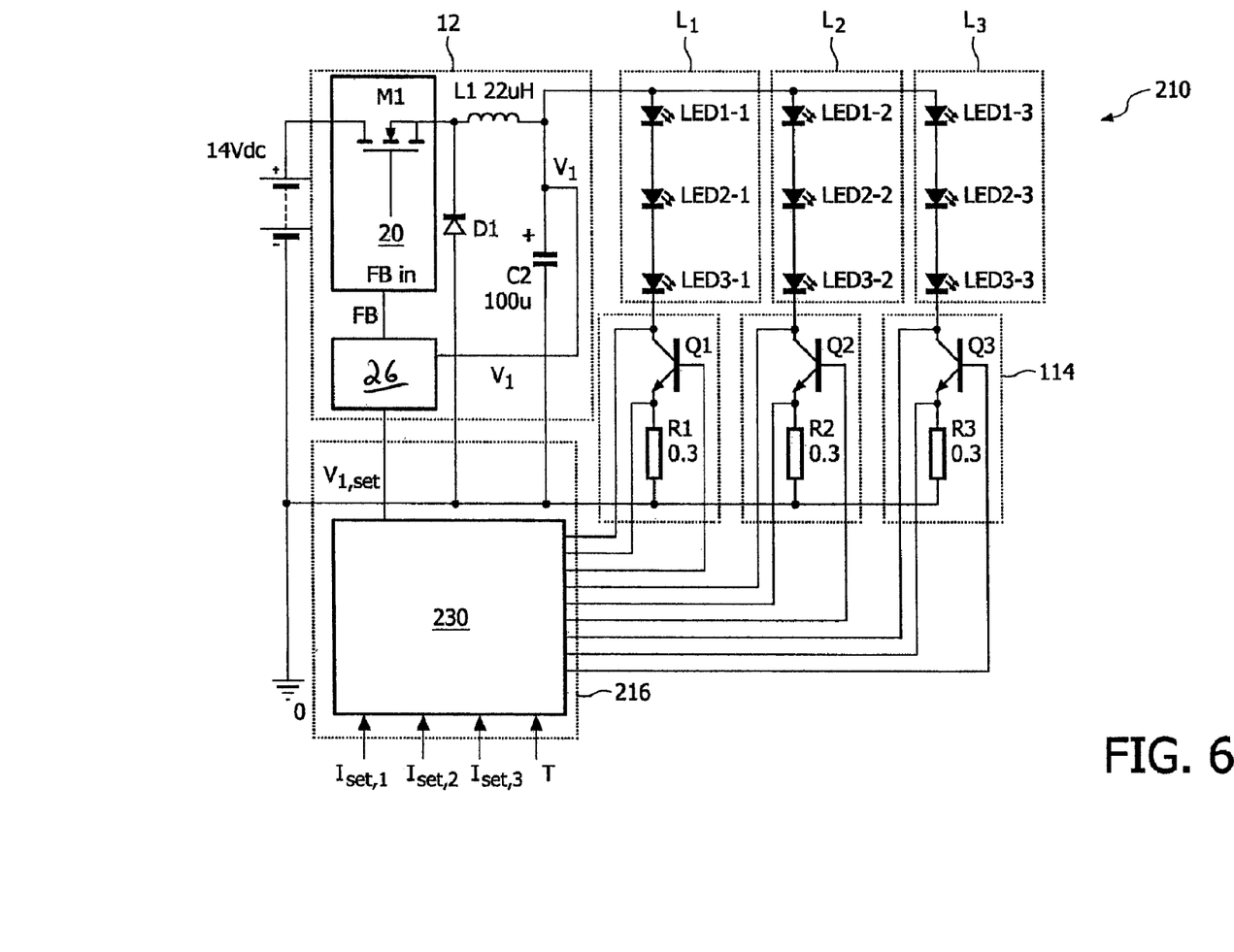
FIG. 6 shows a circuit diagram of a driver circuit according to a third embodiment of the invention.

FIG. 6 shows a third embodiment of a driver circuit 210. Driver circuit 210 corresponds in large parts to driver circuit 110 according to the second embodiment (FIG. 2). Like parts are referenced by like reference numerals and will not be further explained in detail.

Driver circuit 210 is disposed to supply three loads L1, L2, L3. Each load is connected in series to a linear current driver 114, thus forming a branch. The three branches are connected in parallel to the output voltage V1 of the switching converter 12.

A control unit 216 controls the three branches. As in the previous embodiments, a microcontroller 230 supplies a set output voltage $V_{1,\,set}$ to feedback controller 26.

Also, microcontroller 230 accepts input voltages from each of the linear current drivers 114 (comparable to input voltages $V_{L,1}, V_{L,2}$ according to the second embodiment) and delivers output currents to each of the linear current drivers 114 (corresponding to the output $I_B$ in the second embodiment).

The inputs and/or outputs provided at microcontroller 230 may be direct inputs and/or outputs. If the timing permits, the inputs and/or outputs may also be multiplexed, so that for each type of input and/or output, only one A/D or D/A converter is actually used.

In a first operating mode of the device according to FIG. 6, all three loads $L_1$-$L_3$ are driven simultaneously. In this case, control of the switching output voltage $V_1$ is effected according to the branch with the lowest voltage $V_{L,1}$ at the linear current driver, which is controlled to be equal to $V_{threshold}$. In all other branches with less current, the individual linear current drivers 114 limit the current according to the desired $I_{set}$.

Figure 7:
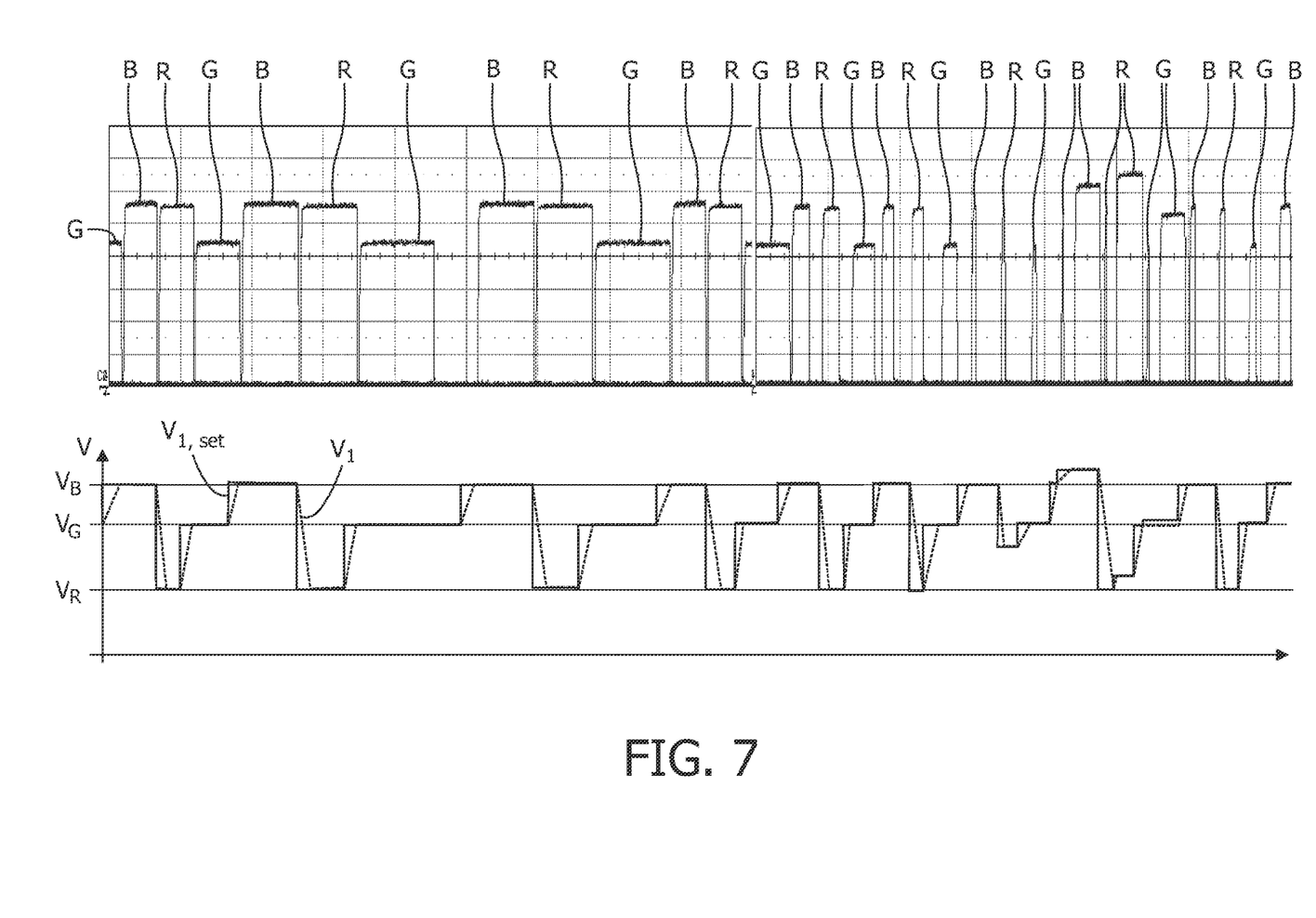
FIG. 7 shows a timing diagram showing measured values of currents and voltages in FIG. 6 in an example of a projection system.

In another operating mode, the loads are operated substantially sequentially (i.e. with no or minimum overlap). A corresponding example of an actual implementation is shown in FIG. 7. Here, the three loads $L_1$-$L_3$ are LED light sources for a back-projection display.

The Red (R), Green (G) and Blue (B) LEDs are sequentially driven with current pulses. The same pulse pattern is repeated with the display frame rate (e.g. 60 Hz). The pulse frequency, however, is substantially higher, in the shown example 50 times higher.

The differently colored LED loads require different voltages for normal light output. As may be seen to the right of the shown sequence, there are additionally very short current pulses in each frame for special correction purposes, which require a higher voltage. Since the sequence is periodically repeated, the microcontroller of the driver circuit may select the necessary voltages in advance.

In the lower half of FIG. 7, the lower horizontal lines show the voltage level required for the blue ($V_B$), green ($V_G$) and red ($V_R$) LED device at normal level. The microcontroller, however, supplies for all other current levels the corresponding voltage level, so that also for the varying pulses the correct current level may be achieved. In the projector shown, the current values are chosen according to the amount of light needed for displaying the desired image. Therefore, in each frame a different absolute current value may be required.

It has thus been shown how the complex control task of producing current pulses as shown in FIG. 7 may be achieved by the relatively simple circuit shown in FIG. 6. Due to the good dynamic properties of the linear current drivers in the three branches, control results are excellent, even at the very short, high current pulses in the last third of the shown sequence.

The invention has been illustrated and described in detail in the drawings and foregoing description. Such illustration and description are to be considered illustrative or exemplary and not restrictive; the invention is not limited to the disclosed embodiments.

In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A driver circuit for a light emitting diode (LED), an organic light emitting diode (OLED), or light amplification by stimulated emission of radiation (LASER) diode device, the circuit comprising:
   a switching converter comprising at least one switching element, at least one reactive element and a switching output voltage, said switching converter being configured to generate said switching output voltage by sequential switching operations of said at least one switching element,
   a terminal for connecting said at LED, OLED or LASER diode device to switching output voltage,
   a linear current driver connected in series to said terminal, said linear current driver comprising an amplification element a current sensor and a current control input to control a drive current for said terminal, and
   a control unit comprising:
   a sensing input for sensing a current and/or voltage at said linear current driver,
   a switching control output for controlling said switching converter,
   a current control output for providing a current control signal to said linear current driver,
   and a programmable controller executing a control program for processing said sensing input and providing said switching control output and a said current control output in accordance with a set current value;
   wherein said set current value comprises one or more variable portions where the set current value changes over time, and one or more steady portions where the set current value remains substantially constant for providing a substantially constant output voltage value for said switching output voltage, and
   wherein said control program is configured to provide said switching control output voltage to increase said switching output voltage more than said substantially constant output voltage value before the variable portion.

2. The driver circuit according to claim 1, wherein at least in a part of said steady portions, said control program is disposed to provide said switching control output voltage such that a voltage over said linear current driver is controlled to be at a threshold value.

3. The driver circuit according to claim 1, wherein said control unit provides a desired output switching voltage, and said switching converter comprises a feedback controller to control the output voltage to the desired output switching voltage.

4. The driver circuit according to claim 1, wherein
   in said variable portion, the set current value rises, and remains at least essentially constant in a following steady portion,
   and wherein said control program is disposed to provide said switching control output to raise said switching output voltage to a higher level before said variable portion, and to a lower level within at least of said following steady portion.

5. The driver circuit according to claim 1, wherein
   said control unit comprises a memory for storing a plurality of desired switching output voltage values and desired drive current values, said program being configured to (i) retrieve values from said memory for determining said desired switching output voltage for a set current value and (ii) to store determined values.

6. The driver circuit according to claim 1, wherein
   a plurality of branches are connected in parallel to said output, each branch comprising at least one terminal for connecting an LED, OLED or LASER diode device,
   in each branch there is provided a linear current driver circuit connected in series to said terminal, and
   said control unit comprises at least one sensing input for sensing a current and/or a voltage within each of said branches.

7. The driver circuit according to claim 6, wherein
   said control program is configured to process said inputs at least one sensing input from said branches and set current values for each of said branches, and
   said switching control output is determined according to the minimum of sensed voltage values at the linear current drivers of each branch.

8. A method for operating at least one a light emitting diode (LED, an organic light emitting diode (OLED) or LASER diode device, comprising the act of:
   generating a switching output voltage in a switching converter comprising at least one switching element and at least one reactive element, by sequential switching operations of said switching element,
   providing said switching output voltage to at least one LED, OLED or LASER diode device,
   controlling a drive current for said at least one LED, OLED or LASER diode device using a linear current driver circuit connected in series to said at least one LED, OLED or LASER diode device, said linear current driver comprising an amplification element, a current sensor and a current control input,
   providing a said switching output voltage and said drive current in accordance with a set current value by executing a control program in a programmable controller processing at least one sensing input from a current and/or a voltage at said linear current driver and controlling said switching converter to deliver said switching output voltage, wherein said set current value comprises one or more variable portions where the set current value changes over time, and one or more steady portions where the set current value remains substantially constant for providing a substantially constant output voltage value for said switching output voltage, and wherein said control program is configured to provide a switching control output to increase said switching output voltage more than said substantially constant output voltage value before the variable portion.

9. A driver circuit for at least one light emitting diode (LED), an organic light emitting diode (OLED) or LASER diode device, the circuit comprising:
   a switching converter comprising:
      at least one switching element,
      at least one reactive element, and
      an output, said switching converter being configured to generate a switching output voltage by sequential switching operations of said at least one switching element,
   a terminal for connecting said at least one LED, OLED or LASER diode device to said output,
   a linear current driver connected in series to said terminal, said linear current driver comprising an amplification element, a current sensor and a current control input to control a drive current for said terminal,
   a control unit, comprising:
      a sensing input for sensing a current and/or voltage at said linear current driver,
      a switching control output for controlling said switching converter,
      a current control output for providing a current control signal to said linear current driver, and
      a programmable controller executing a control program for processing said sensing input and providing said switching control output and said current control output in accordance with a set current value, wherein said control unit comprises memory for storing a plurality of desired switching output voltage values and desired drive current values, and wherein said program is configured to:
   store values determined during control into said memory,
   to retrieve said stored values from said memory for determining said desired switching output voltage for a set current value, wherein said set current value comprises one or more variable portions where the set current value changes over time, and one or more steady portions where the set current value remains substantially constant for providing a substantially constant output voltage value for said switching output voltage, and to provide said switching control output voltage to increase said switching output voltage more than said substantially constant output voltage value before the variable portion.

* * * * *